United States Patent
Shepelev

(10) Patent No.: US 9,696,858 B2
(45) Date of Patent: Jul. 4, 2017

(54) DISPLAY DEVICE HAVING AN INTEGRATED SENSING DEVICE WITH IMPROVED PROXIMITY SENSING

(71) Applicant: Synaptics Incorporated, San Jose, CA (US)

(72) Inventor: Petr Shepelev, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 375 days.

(21) Appl. No.: 14/180,024

(22) Filed: Feb. 13, 2014

(65) Prior Publication Data

US 2015/0009171 A1    Jan. 8, 2015

Related U.S. Application Data

(60) Provisional application No. 61/843,504, filed on Jul. 8, 2013.

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0416* (2013.01)

(58) Field of Classification Search
CPC ..................................................... G06F 3/044
See application file for complete search history.

(56) References Cited

U.S. PATENT DOCUMENTS

| | | | | |
|---|---|---|---|---|
| 5,534,892 A | * | 7/1996 | Tagawa ................. | G06F 3/0412 178/20.01 |
| 2009/0033343 A1 | * | 2/2009 | Reynolds ............. | H03K 17/955 324/688 |
| 2010/0194698 A1 | * | 8/2010 | Hotelling .............. | G06F 1/3218 345/173 |
| 2010/0292945 A1 | * | 11/2010 | Reynolds ................ | G06F 3/044 702/65 |
| 2010/0295824 A1 | * | 11/2010 | Noguchi ............. | G02F 1/13338 345/175 |
| 2012/0154323 A1 | * | 6/2012 | Nambu ................... | G06F 3/044 345/174 |
| 2014/0062937 A1 | * | 3/2014 | Schwartz ............. | G06F 3/0418 345/174 |
| 2014/0210764 A1 | * | 7/2014 | Shepelev ................ | G06F 3/044 345/174 |

* cited by examiner

*Primary Examiner* — Claire X Pappas
*Assistant Examiner* — Robert Stone
(74) *Attorney, Agent, or Firm* — Patterson + Sheridan, LLP

(57) ABSTRACT

Embodiments described herein include a method and apparatus for capacitive sensing in input devices integrated with a display device. In one embodiment, a processing system for a display device comprising an integrated capacitive sensing device is provided that includes a display driver module, a transmitter module, and a receiver module. The display driver and transmitter modules are configured to operate in a display update mode and a sleep mode. The receiver module is configured to, while operating in a doze mode, communicate with and trigger the transmitter module to enter the active sensing mode while the display driver module remains in the sleep mode when presence of an object is detected based on the resulting signals.

17 Claims, 6 Drawing Sheets

DISPLAY DEVICE HAVING AN INTEGRATED SENSING DEVICE WITH IMPROVED PROXIMITY SENSING

CROSS-REFERENCE TO RELATED APPLICATIONS

This applications claims benefit of U.S. Provisional Patent Application Ser. No. 61/843,504, filed Jul. 8, 2013, which is incorporated by reference in its entirety.

FIELD OF THE INVENTION

Embodiments of the present invention generally relate to a method and apparatus for capacitive sensing.

DESCRIPTION OF THE RELATED ART

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones). One common type of proximity sensor device is a capacitive sensing device.

Capacitive sensing devices, when integrated partially or completely within a display device such as a tablet, touch screen or smart phone, have at least some of the sensing electrodes close to TFT structures within the display device. This proximity of the TFT structures causes the sensing electrodes have a high capacitive load. Traditionally, the sensing electrodes are used for sensing mutual capacitance, i.e., capacitance at an intersection of a pair of sensing electrodes. Mutual capacitance measurements are good for touch sensing, and it is known also that mutual capacitance results in a near-field sensing, which has limited capabilities for sensing objects hovering above the sensing electrodes, which is further limited when the sensing electrodes have a high capacitive load due to proximity to TFT structures within the display device.

Conversely, it is preferred to use absolute capacitance measurements from the sensing electrodes for detecting hovering objects. As mentioned above, at least some of the electrodes in a capacitive sensor integrated into a display device have very high capacitive load to a virtual ground. Measuring an absolute capacitance from these same sensing electrodes would require a wide input dynamic range from an analog front-end of a touch integrated circuit (IC), which may not be feasible.

Another problem for absolute capacitance sensing in some implementations where sensor electrodes integrated partially or fully within display device is that the sensor electrodes used for transmitting signals for obtaining mutual capacitance measurements are not connected to a receiver module integrated circuit (IC) directly, but driven by a digital logic distributed between components of a processing system, such as display driver module IC, gate-in-panel logic, and the like. Thus, the sensor electrodes used for transmitting signals are not available for absolute capacitance measurements by receiver module IC.

Thus, there is a need for an improved a method and apparatus for capacitive sensing in input devices integrated with a display device.

SUMMARY OF THE INVENTION

Embodiments described herein include an input device for capacitive sensing integrated with a display device, a processing system and a method for operating an input device for capacitive sensing. In various embodiments, plane area of sensor electrodes is selectively changed, thereby configuring the input device for enhance absolute sensing while in certain modes of operation.

In one embodiment, an input device comprising a display device having an integrated capacitive sensing device is provided. The input device includes a processing system configured to be selectively coupled to a first sensor electrode of a plurality sensor electrode and to a second sensor electrode of the plurality of sensor electrode. Each of the plurality of sensor electrodes includes at least one of a plurality of display electrodes. The processing system is configured to be selectively coupled to the first sensor electrode of the plurality of sensor electrodes when operating in a first input sensing mode, and configured to be selectively coupled to the second electrode of the plurality of sensor electrodes when operating in a second input sensing mode. The first sensor electrode having a plane area greater than a plane area of the second sensor electrode.

In another embodiment, a processing system for an input device having a display device integrated with a capacitive sensing device is provided. The processing system includes a driver module and a sensor module. The driver module is configured to be selectively coupled to at least a first sensor electrode of the plurality of sensor electrode and to drive the first sensor electrode as a transmitter electrode for transcapacitive sensing. The sensor module is configured to be selectively coupled to at least a second sensor electrode of the plurality of sensor electrodes and to drive and receive with the second sensor electrode for absolute capacitive sensing.

In yet another embodiment, a method for sensing presence of an input object using capacitive sensing device. The method includes performing a first type of capacitive sensing with a display driver module coupled to a first set of sensor electrodes of a plurality of sensor electrodes, each of the plurality of sensor electrodes comprising display electrodes; coupling the display driver module to a second set of sensor electrodes of the plurality of sensor electrodes, the second set of sensor electrodes having a plane area larger than a plane area of the first set of sensor electrodes; and performing a second type of capacitive sensing with the display driver module coupled to the second set of sensor electrodes.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
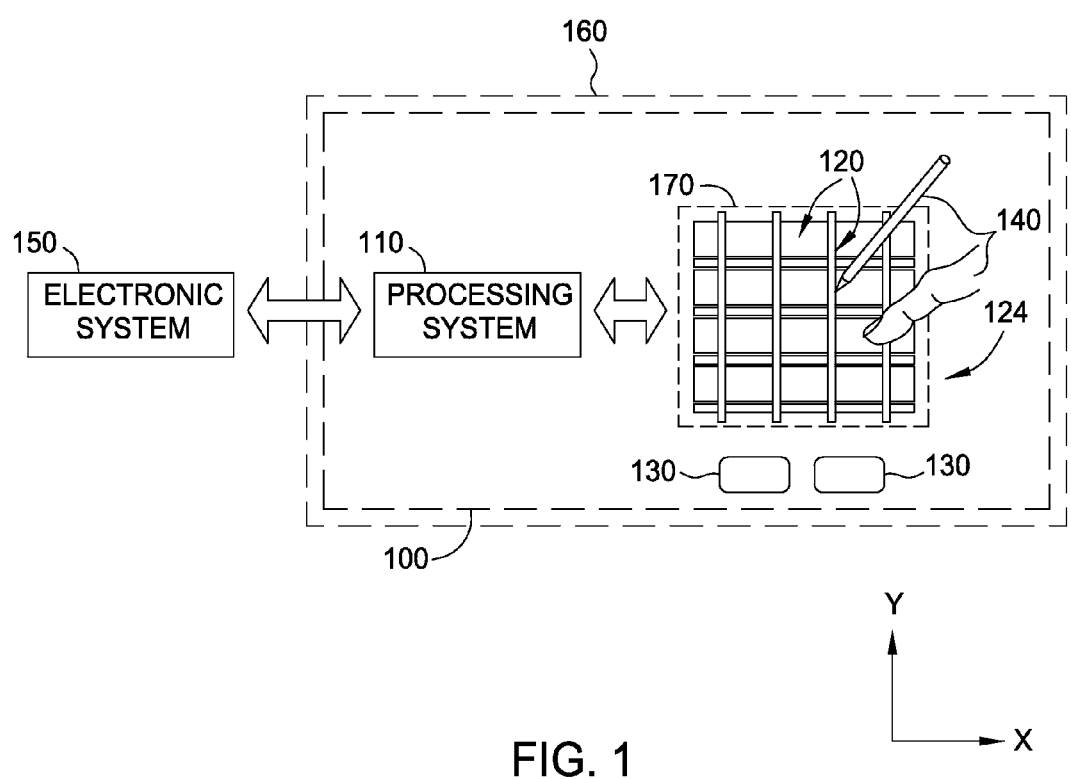
FIG. 1 is a schematic block diagram of an input device.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present technology provide input devices and methods for improving usability. Particularly, embodiments described herein advantageously utilize sensing electrodes created in layer of transmitter electrodes for absolute capacitance measurements. These measurements can enable two dimensional (2D) proximity sensing that enable hovering finger detection and tracking. Since capacitive loading of the sensing electrodes is generally proportional to area of the electrodes, high capacitive loading can be avoided by using only a small part of the transmitter electrodes for absolute capacitance measurements. The entire transmitter electrode may still be used to enable robust transcapacitive sensing when desired.

The transmitter electrodes may be segmented and switches utilized to connect the segments to control the plane area of the sensor electrodes. For example, a switch connecting two sensor electrodes may be closed to create a single large plane area transmitter electrode for transcapacitive sensing. Conversely, the switch may be opened to isolate the segments of the transmitter electrode, such that only a portion of the transmitter electrode, i.e., one of the sensor electrodes, is utilized for absolute capacitance sensing.

FIG. 1 is a schematic block diagram of an input device 100 in accordance with embodiments of the present technology. In one embodiment, input device 100 comprises a display device comprising an integrated sensing device. Although the illustrated embodiments of the present disclosure are shown integrated with a display device, it is contemplated that the invention may be embodied in the input devices that are not integrated with display devices. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system 150. As appropriate, the input device 100 may communicate with parts of the electronic system 150 using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensing elements 124 for detecting user input. The sensing elements 124 include a plurality of sensor electrodes 120. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 124 pickup loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements 124 to create electric fields. In some capacitive implementations, separate sensing elements 124 may be ohmically shorted together to form larger sensor electrodes. Some capacitive implementations utilize resistive sheets, which may be uniformly resistive.

As discussed above, some capacitive implementations utilize "self capacitance" (or "absolute capacitance") sensing methods based on changes in the capacitive coupling between sensor electrodes 120 and an input object. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g. system ground), and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensor electrodes 120. In various embodiments, an input object 140 near the sensor electrodes 120 alters the electric field between the sensor electrodes 120, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes") as further described below. Transmitter sensor electrodes may be modulated relative to a reference voltage (e.g., system ground) to transmit a transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes 120 may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) 124 of the input device 100. In other embodiments, components of processing system 110 are physically separate with one or more components close to sensing element(s) 124 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) 124 to detect input, identification modules configured to identify gestures such as mode changing gestures, and mode changing modules for changing operation modes.

In some embodiments, the processing system 110 responds to user input (or lack of user input) in the sensing region 170 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) 124 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensing elements 124. As another example, the processing system 110 may perform filtering, demodulation or other signal conditioning. In various embodiments, the processing system 110 generates a capacitive image directly from the resulting signals received with sensing elements 124 (sensor electrodes 120). In other embodiments, processing system 110 spatially filters (e.g., taking a difference, weighted sum of neighboring elements) the resulting signals received with sensing elements 124 (or sensor electrodes 120) to generate a sharpened or averaged image. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of a display device 160. The display device 160 may be a tablet, touch screen, smart phone, a personal digital assistant, a cell phone, or other similar device. For example, the input device 100 may comprise substantially transparent sensing elements 124 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing (e.g., the active matrix control electrodes configured to control the source, gate and/or VCOM voltages). Shared components may include display electrodes, substrates, connectors and/or connections. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

In one embodiment, the sensor electrodes 120 may be arranged on different sides of the same substrate. For example, each of the sensor electrode(s) 120 may extend longitudinally across one of the surfaces of the substrate. Further still, on one side of the substrate, the sensor electrodes 120 may extend in a first direction, but on the other side of the substrate, the sensor electrodes 120 may extend in a second direction that is either parallel with, or perpendicular to, the first direction. For example, the electrodes 120 may be shaped as bars or stripes where the electrodes 120 on one side of the substrate extend in a direction perpendicular to the sensor electrodes 120 on the opposite side of the substrate.

The sensor electrodes may be formed into any desired shape on the sides of the substrate. Moreover, the size and/or shape of the sensor electrodes 120 on one side of the substrate may be different than the size and/or size of the electrodes 120 on another side of the substrate. Additionally, the sensor electrodes 120 on the same side may have different shapes and sizes.

In another embodiment, the sensor electrodes 120 may be formed on different substrates that are then laminated together. In one example, a first plurality of the sensor electrodes 120 disposed on one of the substrate may be used to transmit a sensing signal (i.e., transmitter electrodes) while a second plurality of the sensor electrodes 120 disposed on the other substrate are used to receive resulting signals (i.e., receiver electrodes). In other embodiments, the first and/or second plurality of sensor electrodes may be driven as absolute capacitive sensor electrodes. In one embodiment, the first plurality of sensor electrodes may be larger (larger surface area) than the second plurality of sensor electrodes, although this is not a requirement. In other embodiments, the first plurality and second plurality of sensor electrodes may have a similar size and/or shape. Thus, the size and/or shape of the sensor electrodes 120 on one of the substrates may be different than the size and/or size of the electrodes 120 on the other substrate. Nonetheless, the sensor electrodes 120 may be formed into any desired shape on their respective substrates. Additionally, the sensor electrodes 120 on the same substrate may have different shapes and sizes.

In another embodiment, the sensor electrodes 120 are all located on the same side or surface of a common substrate. In one example, a first plurality of the sensor electrodes are comprised of jumpers in regions where the first plurality of sensor electrodes crossover the second plurality of sensor electrodes, where the jumpers are insulated from the second plurality of sensor electrodes. As above, the sensor electrodes 120 may each have the same size or shape or differing size and shapes.

In another embodiment, the sensor electrodes 120 are all located on the same side or surface of the common substrate and are isolated from each other in the sensing region 170. In such embodiments, the sensor electrodes 120 are electrically isolated from each other. In one embodiment, the electrodes 120 are disposed in a matrix array where each sensor electrode 120 is substantially the same size and/or shape. In such embodiment, the sensor electrodes 120 may be referred to as a matrix sensor electrode. In one embodiment, one or more of sensor electrodes of the matrix array of sensor electrodes 120 may vary in at least one of size and shape. Each sensor electrode of the matrix array may correspond to a pixel of the capacitive image. In one embodiment, the processing system 110 is configured to drive the sensor electrodes 120 with a modulated signal to determine changes in absolute capacitance. In another embodiment, processing system 110 is configured to drive a transmitter signal onto a first one of the sensor electrodes 120 and receive a resulting signal with a second one of the sensor electrodes 120. Further, one or more grid electrodes may be disposed on the common substrate, between the sensor electrodes 120 where the grid electrode(s) may be used to guard or shield the sensor electrodes. As used herein, shielding refers to driving a constant voltage onto an electrode and guarding refers to driving a varying voltage signal onto a second electrode that is substantially similar in amplitude and phase to the signal modulating first electrode in order to measure the capacitance of the first electrode. Floating an electrode can be interpreted as a form of guarding in cases where, by floating, the second electrode receives the desired guarding waveform via capacitive coupling from the first or third electrode in the input device 100. In various embodiments, guarding may be considered to be a subset of shielding such that guarding a sensor electrode would also shield that sensor electrode. The grid electrode may be driven with a varying voltage, a substantially constant voltage or electrically floated. The grid electrode may also be used as a transmitter electrode when it is driven with a transmitter electrode such that the capacitive coupling between the grid electrode and one or more sensor electrodes may be determined. In one various embodiments, a floating electrode may be disposed between the grid electrode and the sensor electrodes. In one particular embodiment, the floating electrode, the gird electrode and the sensor electrode comprise the entirety of a common electrode of a display device. In other embodiments, the grid electrode may be disposed on a separate substrate or surface of a substrate than the sensor electrodes 120 or both. Although the sensor electrodes 120 may be electrically isolated on the substrate, the electrodes may be coupled together outside of the sensing region 170—e.g., in a connection region that transmits or receives capacitive sensing signals on the sensor electrodes 120. In various embodiments, the sensor electrodes 120 may be disposed in an array using various patterns where the electrodes 120 are not all the same size and shape. Furthermore, the distance between the electrodes 120 in the array may not be equidistant.

In any of the sensor electrode arrangements discussed above, the sensor electrodes 120 and/or grid electrode(s) may be formed on a substrate that is external to the display device 160. For example, the electrodes 120 and/or grid electrode(s) may be disposed on the outer surface of a lens in the input device 100. In other embodiments, the sensor electrodes 120 and/or grid electrode(s) are disposed between the color filter glass of the display device and the lens of the input device. In other embodiments, at least a portion of the sensor electrodes and/or grid electrode(s) may be disposed such that they are between a Thin Film Transistor substrate (TFT substrate) and the color filter glass of the display device 160. In one embodiment, a first plurality of sensor electrodes and/or grid electrode(s) are disposed between the TFT substrate and color filter glass of the display device 160 and the second plurality of sensor electrodes and/or a second grid electrode(s) are disposed between the color filter glass and the lens of the input device 100. In yet other embodiments, all of sensor electrodes 120 and/or grid electrode(s) are disposed between the TFT substrate and color filter glass of the display device, where the sensor electrodes may be disposed on the same substrate or on different substrates as described above.

In one or more embodiment, at least a first plurality the sensor electrodes 120 comprised one or more display electrodes of the display device that are used in updating the display. For example, the sensor electrodes 120 may comprise the common electrodes such as one or more segments of a Vcom electrode, a source drive line, gate line, an anode sub-pixel electrode or cathode pixel electrode, or any other display element. These display electrodes may be disposed on an appropriate display screen substrate. For example, the common electrodes may be disposed on the a transparent substrate (a glass substrate, TFT glass, or any other transparent material) in some display screens (e.g., In Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) Multi-domain Vertical Alignment (MVA), IPS and FFS), over an cathode layer (OLED), etc. In such embodiments, the common electrode can also be referred to as a "combination electrode", since it performs multiple functions. In various embodiments, each of the sensor electrodes 120 comprises one or more common electrodes associated with a pixel or sub pixel. In other embodiments, at least two sensor electrodes 120 may share at least one common electrode associated with a pixel or sub-pixel. While the first plurality sensor electrodes may comprise one or more common electrodes configured for display updating and capacitive sensing, the second plurality of sensor electrodes may be configured for capacitive sensing and not for display updating. Further, in one or more embodiments, the grid electrode and/or floating electrode, when present, comprise one or more common electrodes.

Alternatively, all of the sensor electrodes 120 may be disposed between the TFT substrate and the color filter glass of the display device 160. In one embodiment, a first plurality of sensor electrodes are disposed on the TFT substrate, each comprising one or more common electrodes and a second plurality of sensor electrodes may be disposed between the color filter glass and the TFT substrate. Specifically, the receiver electrodes may be part of a black mask on the color filter glass. In another embodiment, all of the sensor electrodes 120 comprise one or more common electrodes. The sensor electrodes 120 may be located entirely on the TFT substrate or the color filter glass as an array of electrodes. As discussed above, some of the sensor electrodes 120 may be coupled together in the array using jumper or all the electrodes 120 may be electrically isolated in the array and use grid electrodes to shield or guard the sensor electrodes 120. In one more embodiments, the grid electrode, when present, comprises one or more common electrodes.

In any of the sensor electrode arrangements described above, the sensor electrodes 120 may be operated in the input device 100 in the transcapacitive sensing mode by dividing the sensor electrodes 120 into transmitter and receiver electrodes or in the absolute capacitive sensing mode, or some mixture of both.

Figure 2:
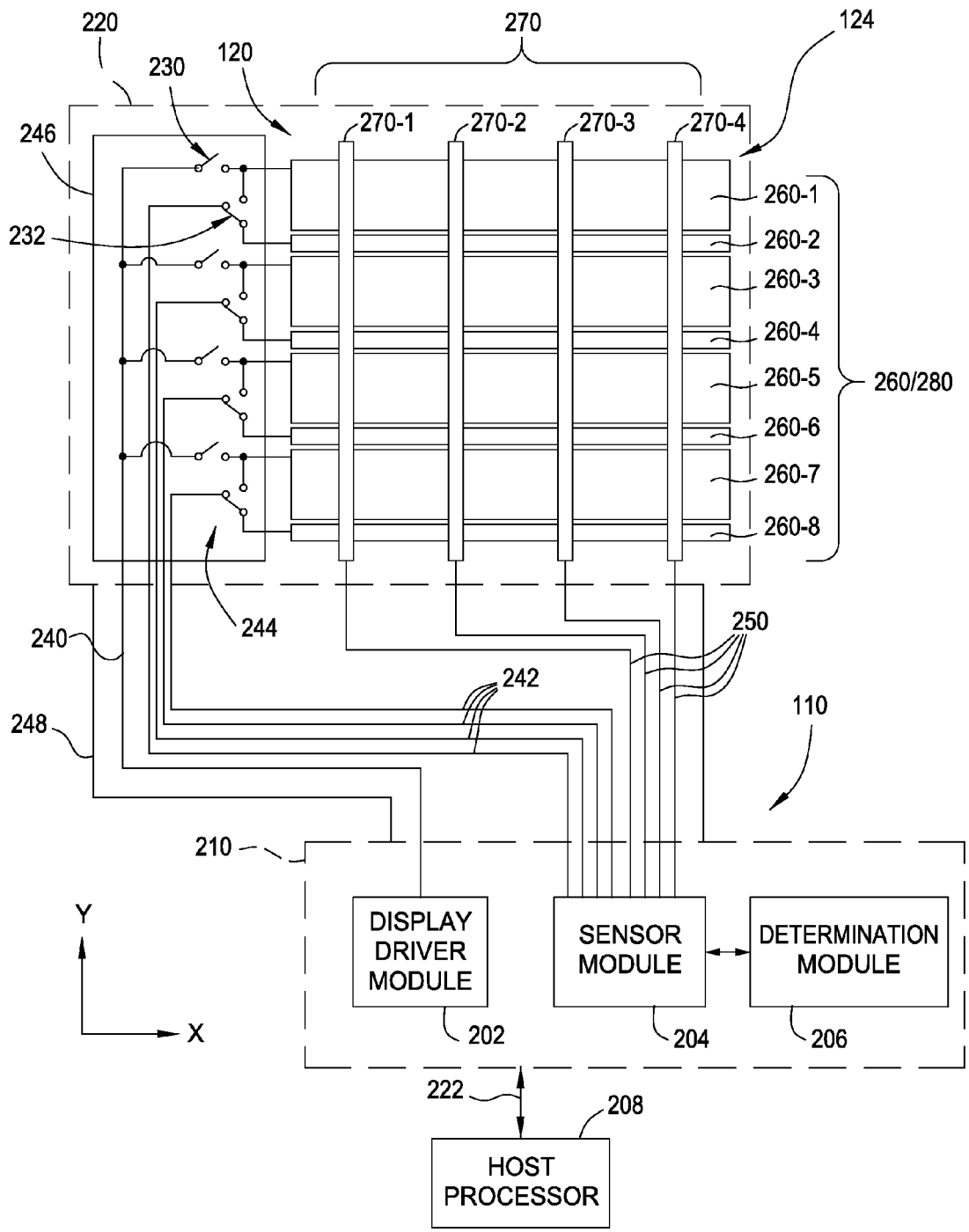
FIG. 2 is a simplified exemplary array of sensing elements coupled to a processing system of the input device of FIG. 1.

FIG. 2 is a simplified exemplary array of sensing elements 124 coupled to the processing system 110 of the input device 100 of FIG. 1 illustrating an exemplary pattern for the sensor electrodes 120 that may be used to sense the positional information of an input object 140 within the sensing region 170. The array of sensing elements 124 are selectively coupled to components of the processing system 110, such as an display driver module 202, a sensor module 204 and a determination module 206. For clarity of illustration and description, FIG. 2 illustrates the pattern of the sensor electrodes 120 as bars arranged in columns and rows, and does not show all of the interconnecting features and/or other related components. While FIG. 2 illustrates the sensor electrode pattern as a pattern of simple columns and rows that are orthogonal, this is not meant to be limiting and in other embodiments, various numbers, orientations and shapes for the sensor electrodes 120 comprising an array of sensing elements 124 may be utilized.

The pattern of sensor electrodes 120 may be comprised of a plurality of transmitter electrodes 280 and a plurality of receiver electrodes 270. The transmitter electrodes 280 may be used to update parts of a display and for capacitive sensing, and thus are referred to herein as "common electrodes," and the receiver electrodes 270 are configured to receive the resulting capacitive sensing signal(s) delivered through the common electrode(s), and thus are referred to herein as "receiver electrodes". The transmitter electrodes 280 may be comprised of a plurality of segments 260 (e.g., transmitter electrode segments 260-1, 260-2, 260-3, 260-4, . . . , 260-8). The transmitter electrode segments 260 may be selectively coupled together internally or externally from processing system 110 when driven as a single transmitter electrode 280. In one embodiment one or more multiplexers may be used to couple the processing system 110 with the transmitter electrodes 280.

In some embodiments, the transmitter electrodes 280 and the receiver electrodes 270 may be similar in size and/or shape. In other embodiments, transmitter electrodes 280 and receiver electrodes 270 may have different size and/or shape. In the embodiment depicted in FIG. 2, the transmitter electrodes 280 are arranged in rows while the receiver electrodes 270 are arranged in columns. The orientation between the rows of transmitter electrodes 280 and the columns of receiver electrodes 270 is shown as orthogonal in FIG. 2 without limitation, and in other embodiments, various numbers, orientations and shapes for the transmitter electrodes 280 and the receiver electrodes 270 comprising an array of sensing elements 124 may be utilized.

In one embodiment, each of the first and second transmitter electrode segments 260-1, 260-2 is selectively driven by processing system 110. In one embodiment, processing system 110 drives the transmitter electrode segments 260-1, 260-2 as a first transmitter electrode 280-1 for transcapacitive sensing. In such an embodiment, the transmitter electrode segments 260-1, 260-2 may be coupled together internally or externally from processing system 110 when they are driven for as a transmitter electrode 280. Further, the transmitter electrode segments 260-1, 260-2 may be simultaneously driven with the same signal, forming the first transmitter electrode 280-1. Processing system 110 may be further configured to drive one of the transmitter electrode segments 260-1, 260-2 for absolute capacitance sensing. In one embodiment, the first transmitter electrode segment 260-1 may be electrically floated, driven with a guard signal or coupled to a substantially constant voltage while the second transmitter electrode segment 260-2 is driven for absolute capacitance sensing; driving and receiving with the second transmitter electrode segment 260-2 to determine a change in capacitance between the second transmitter electrode segment 260-2 and an input object 140 in an absolute capacitance sensing route.

While transmitter electrode segments 260-1, 260-2 may be driven as a transmitter electrode 280, in another embodiment, the first transmitter electrode segment 260-1 may be driven as a receiver electrode for a transcapacitive sensor and the second transmitter electrode segment 260-2 may be driven as an absolute capacitive sensor. For example, processing system 110 is configured to receive resulting signals with the first transmitter electrode segment 260-1 while transmitting transmitter signals with another sensor electrode (transmitter electrode) and drive and receive with the second transmitter electrode segment 260-2 to determine a change in absolute capacitance. In one embodiment, processing system 110 is configured to receive resulting signals with the first and second transmitter electrode segments 260-1, 260-2 while transmitting transmitter signals with another sensor electrode(s) (transmitter electrodes 280) and drive and receive with the second sensor electrode to determine changes in absolute capacitance.

While not illustrated in any of the above embodiments, one or more floating electrodes may be disposed above the sensor electrodes 120. The floating electrodes may be patterned such that one or more floating electrodes at least partially overlap the region of intersection of each pair of transmitter and receiver electrodes 280, 270. In one embodiment, each floating electrode may have one or more apertures. Further, the floating electrodes may have various sizes and shapes.

Figure 3:
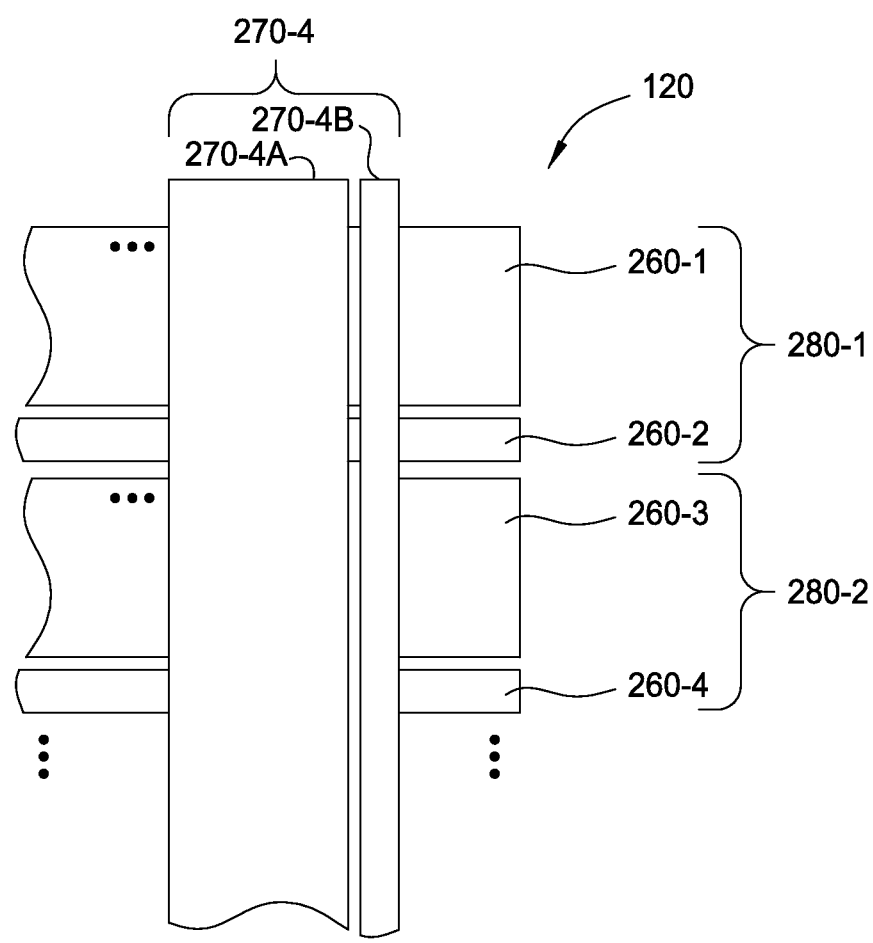
FIG. 3 is an enlarged portion of the array of sensing elements illustrated in FIG. 2.

FIG. 3 is an enlarged portion of the array of sensing elements 124 illustrated in FIG. 2. In the example shown FIG. 3, the pattern of sensor electrodes 120 comprises a first plurality of transmitter electrodes 280 (e.g., transmitter electrodes 280-1, 280-2, . . . ) and a second plurality of receiver electrodes 270. Each transmitter electrode segments 260 comprising each transmitter electrode 280 may have the same plane area, or at least one of the transmitter electrode segments 260 comprising each transmitter electrode 280 may have a plane area less than another one of the transmitter electrode segments 260 comprising the transmitter electrode 280.

Each of the transmitter electrodes 280 may be comprised of at least two connectable transmitter electrode segments 260 which may be selectively coupled when desired to control (i.e., selectively increase or decrease) the plane area of an individual transmitter electrode 280. As mentioned above, conventional arrangements of sensor electrodes have a high capacitive load to a virtual ground, requiring a processing system having a wide dynamic range in order to measure the absolute capacitance, which may increase the cost and complexity of the processing system 110. In the present invention, since the capacitive load of a transmitter electrodes 280 is proportional to plane area which can be selectively controlled, the plane area of a selective one of the transmitter electrodes 280 may be selectively reduced by using only some of the transmitter electrode segments 260 when absolute capacitive sensing, which thereby reduces the capacitive load and accordingly the reduces the need for a wide dynamic range compared to as needed for conventional designs. For example, the transmitter electrode 280-1 may be comprised of at least the transmitter electrode segment 260-1 and the transmitter electrode segment 260-2, which may be selectively coupled when desired to define the plane area of the transmitter electrode 280-1 as the sum of the plane areas of the transmitter electrode segments 260-1 and 260-2. The transmitter electrode 280-1 having the large plane area defined by the transmitter electrode segments 260-1 and 260-2 may be coupled to the display driver module 202 for display updating and performing a type of capacitive sensing. Additionally, less than all of the transmitter electrode segments 260 comprising an individual transmitter electrode 280 may be selectively to the sensor module 204 when desired. For example, the transmitter electrode segment 260-1 may be decoupled from the transmitter electrode segment 260-2 such that only the transmitter electrode segment 260-2 defines the plane area of the transmitter electrode 280-1. The transmitter electrode 280-1 having the small plane area defined by the transmitter electrode segment 260-2 may be coupled to the sensor module 204 for performing a different type of capacitive sensing. In this manner, the plan area of the transmitter electrodes 280 may be selectively increased or decreased, and selectively coupled to either the display driver module 202 or the sensor module 204 depending on the type of capacitive sensing desired at a particular point in time or a particular input in the sensing region 170.

The second plurality of receiver electrodes 270 may be optionally comprise segments which may be electrically coupled or isolated to controllably select the plane area of each receiver electrodes 270. For example, the receiver electrodes 270 may be comprises of receiver electrode segments 270-1, 270-2, 270-3 . . . 270-4, which may disposed above, below, or on the same layer as the first plurality of transmitter electrodes 280. At least two of the receiver electrode segments maybe selectively coupled for form an individual receiver electrode 270 when desired.

One will note that the pattern of sensor electrodes 120 illustrated in FIG. 2 may alternatively utilize various sensing techniques, such as mutual capacitive sensing, absolute capacitive sensing, elastive, resistive, inductive, magnetic acoustic, ultrasonic, or other useful sensing techniques, without deviating from the scope of the invention described herein.

Returning to FIG. 2, the transmitter electrodes 280 and receiver electrodes 270 are typically ohmically isolated from each other. That is, one or more insulators separate transmitter electrodes 280 and receiver electrodes 270 and prevent them from electrically shorting to each other in regions where they may overlap. In some embodiments, transmitter electrodes 280 and receiver electrodes 270 are separated by electrically insulative material disposed between them at cross-over areas. In such configurations, the transmitter electrodes 280 and/or receiver electrodes 270 may be formed with jumpers connecting different portions of the same electrode. In some embodiments, transmitter electrodes 280 and receiver electrodes 270 are separated by one or more layers of electrically insulative material. In some other embodiments, transmitter electrodes 280 and receiver electrodes 270 are separated by one or more substrates, for example, they may be disposed on opposite sides of the same substrate, or on different substrates that are laminated together. In the embodiment shown in FIG. 2, the transmitter electrodes 280 generally have greater surface area than the receiver electrodes 270. As discussed above with reference to FIG. 3, one or more of the transmitter electrodes 280 may be comprised of two or more sensor transmitter electrode segments 260, such that the number of transmitter electrode segments 260 comprising a particular transmitter electrode 280 may selectively controlled, which ultimately allows the plan area of the individual transmitter electrode 280 to be selectively chosen to enhance absolute and transcapacitive sensing, as further discussed below. In various embodiments, as will be discussed in more detail later, transmitter electrodes 280 and receiver electrodes 270 may be disposed on a single layer of a substrate. In yet other embodiments, other electrodes (not shown in FIG. 2), including but not limited to, a shield electrode(s) may be disposed proximate to either transmitter electrodes 280 or receiver electrodes 270. The shield electrode may be configured to shield the transmitter electrodes 280 and/or receiver electrodes 270 from interference such as nearby sources of driven voltages and/or currents. In some embodiments, the shield electrode (s) may be disposed with transmitter electrodes 280 and receiver electrodes 270 on a common side of a substrate. In other embodiments, the shield electrode(s) may be disposed with transmitter electrodes 280 on a common side of a substrate. In other embodiments, the shield electrode(s) may be disposed with receiver electrodes 270 on a common side of a substrate. In yet other embodiments, the shield electrode may be disposed on a first side of a substrate while transmitter electrodes 280 and/or receiver electrodes 270 are disposed on a second side, opposite the first.

In one embodiment, the areas of localized capacitive coupling between transmitter electrodes 280 and receiver electrodes 270 may be termed "capacitive pixels." The capacitive coupling between the transmitter electrodes 280 and receiver electrodes 270 change with the proximity and motion of input objects in the sensing region associated with the transmitter electrodes 280 and receiver electrodes 270.

In some embodiments, the pattern of sensor electrodes 120 is "scanned" to determine these capacitive couplings. That is, the transmitter electrodes 280-1, 280-2, etc., are driven to transmit transmitter signals. In other embodiments, as described herein, the pattern of sensor electrodes 120 may be "non-sequentially" scanned to determine capacitive couplings, such any order of transmitter electrodes 280 (i.e., not just adjacent transmitter electrodes 280-1, 280-2, etc., in a sequential order) may be driven to transmit transmitter signals.

The input device 100 may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 270 to be independently determined. The receiver electrodes 270 may be operated singly or multiply to acquire resulting signals (i.e., received capacitive sensing signals). The resulting signals may be used to determine measurements of the capacitive couplings at the capacitive pixels, which are used to determine whether an input object is present and its positional information, as discussed above. A set of values for the capacitive pixels form a "capacitive image" (also "capacitive frame" or "sensing image") representative of the capacitive couplings at the pixels. Multiple capacitive images may be acquired over multiple time periods, and differences between them used to derive information about input object(s) in the sensing region. For example, successive capacitive images acquired over successive periods of time can be used to track the motion(s) of one or more input objects entering, exiting, and within the sensing region. In various embodiments, the sensing image, or capacitive image, comprises data received during a process of measuring the resulting signals received with at least a portion of the sensing elements 124 distributed across the sensing region 170. The resulting signals may be received at one instant in time, or by scanning the rows and/or columns of sensing elements distributed across the sensing region 170 in a raster scanning pattern (e.g., serially poling each sensing element separately in a desired scanning pattern), row-by-row scanning pattern, column-by-column scanning pattern or other useful scanning technique. In many embodiments, the rate that the "sensing image" is acquired by the input device 100, or sensing frame rate, is between about 60 and about 180 Hertz (Hz), but can be higher or lower depending on the desired application.

In some touch screen embodiments, the transmitter electrodes 280 and/or the receiver electrodes 270 are disposed on a substrate 220 of the associated display device 160. For example, the transmitter electrodes 280 and/or the receiver electrodes 270 may be disposed on a polarizer, a color filter substrate, or a glass sheet of an LCD. In one embodiment, the transmitter electrodes 280 may be disposed within a display element of the display device comprised of at least a polarizer, a color filter substrate, and a glass sheet of an LCD. As a specific example, the transmitter electrodes 280 may be disposed on a TFT (Thin Film Transistor) substrate of an LCD, and may or may not also be used in display operations of the display device. As another example, the receiver electrodes 270 may be disposed on a color filter substrate, on an LCD glass sheet, on a protection material disposed over the LCD glass sheet, on a lens glass (or window), and the like. In those embodiments, where transmitter electrodes 280 and/or receiver electrodes 270 are disposed on a substrate within the display device (e.g., color filter glass, TFT glass, etc.), the sensor electrodes may be comprised of a substantially transparent material (e.g., ITO, ATO) or they may be comprised of an opaque material and aligned with the pixels of the display device (e.g., disposed such that they overlap with the "black mask" between pixel dots or a subpixel of the pixel). As discussed above, the sensor electrodes 120 depicted in FIG. 2 may comprise one or more electrodes that are shared with a display device 160 for display updating. In one embodiment, the transmitter electrodes 280 may comprise one or more common electrodes disposed on the active layer of a display device 160 while the receiver electrodes 270 may be disposed on the color filter glass between the active layer of the display and the color filter glass of the display device 160. In another embodiment, the transmitter electrodes 280 may comprise one or more common electrodes while the receiver electrodes 270 may be disposed on the color filter glass between the color filter glass of the display device 160 and a lens of the input device 100. In another embodiment, the transmitter electrodes 280 may comprise one or more common electrodes while the receiver electrodes 270 may be disposed on another substrate between the color filter glass of the display device 160 and a lens of the input device 100. In one embodiment, the sensor electrodes 120, including the transmitter electrodes 280 and the receiver electrodes 270 may comprise one or more common electrodes disposed on the active layer. In any of the above embodiments, the receiver electrodes 270 may be disposed on multiple layers or substrates.

In some touch screen embodiments, as shown in FIG. 2, transmitter electrodes comprise one or more common electrodes (e.g., segments of a segmented "V-com electrode"), hereafter referred to as "common electrodes," used in updating the display of the display screen. While the transmitter electrodes, or common electrodes, can be used to perform other capacitive sensing techniques, as discussed above, for clarity and simplicity of the discussion a common electrode capacitive sensing configuration is primarily used in the discussion below. These common electrodes may be disposed on an appropriate display screen substrate. For example, the common electrodes may be disposed on the TFT glass in some display screens (e.g., In Plane Switching (IPS) or Plane to Line Switching (PLS)), on the bottom of the color filter glass of some display screens (e.g., Patterned Vertical Alignment (PVA) or Multi-domain Vertical Alignment (MVA)), etc. In such embodiments, the common electrode can also be referred to as a "combination electrode," since it performs multiple functions. In various embodiments, each transmitter electrode comprises one or more common electrodes. In other embodiments, at least two transmitter electrodes may share at least one common electrode.

In various embodiments, processing system 110 drives the common electrodes for display updating and capacitive sensing in the same time period, or in different time periods. For example, the common electrodes may transmit signals for display updating during a display-update time of a row update cycle, and transmit signals for capacitive sensing during a non-display time of the row update cycle (e.g., sometimes called "horizontal blanking time"). In another example, processing system 110 drives the common electrodes may for display updating during a display-update time of a row update cycle, and for capacitive sensing during a sensing period between two display row update periods of a display frame, where the display period may be at least as long as a display row update period (e.g., sometimes called "long horizontal blanking time" or "in-frame blanking time" or "distributed vertical blanking time"). In one embodiment, the sensing period is a multiple combined non-display times of the row update cycles. As another example, processing system 110 drives the common electrodes for display updating during row update cycles with actual display row updates, and for capacitive sensing during extra "row update cycles" without actual display row updates (e.g., the non-display times between updating sections of frames or entire frames, sometimes called "vertical blanking time"). Further, in various embodiments, processing system 110 drives the common electrodes for capacitive sensing during any combination of the above non-display times. In another embodiment, processing system 110 drives the common electrodes signals simultaneously for display updating and capacitive sensing, but separate them spatially. For example, a first common electrode corresponding to a first display row may be driven for display updating and a second common electrode corresponding to a second display row may be driven for input sensing such that they at least partially overlap in time. In yet a further example, the common electrodes may use the same transmission for both display updating and capacitive sensing.

As discussed above, the processing system 110 of input device 100 includes the display driver module 202, the sensor module 204 and the determination module 206. The sensor module 204 include receiver circuitry that is coupled to the receiver electrodes 270. The receiver circuitry of the sensor module 204 may also be selectively coupled to the transmitter electrodes 280. In one mode of operation, the sensor module 204 is coupled to selected segments 260 of the transmitter electrodes 280 such that the sensor module 204 may provide and receive signals utilizing selected segments 260 of the transmitter electrodes 280 when the input device 100 is operating in a first type of capacitive sensing, for example, absolute sensing. In another mode of operation, the receiver circuitry of the sensor module 204 may also be utilized to receive the resulting signals from the receiver electrodes 270 when the input device 100 is operating in a second type of capacitive sensing, for example, transcapacitive sensing. In various embodiments, the sensor module 204 is used to acquire sensor data (e.g., receive resulting signals), which is provided to the determination module 206. The determination module 206 may be configured to perform various calculations to determine the positional information of an input object 140 in the sensing region 170. The determination module 206 may optionally be part of a host processor 208 of the electronic system 150. The display driver module 202 includes driver circuitry is selectively coupled with common electrodes, and comprises driver circuitry configured for displaying images on the display screen, i.e., update the display screen. The driver circuitry is configured to apply one or more pixel voltage(s) to the display pixel electrodes through pixel source drivers (not shown). The driver circuitry is also configured to apply one or more common drive voltage(s) to the common electrodes, and operate them as common electrodes of the display screen. The display driver module 202 also includes transmitter circuitry configured to operate the common electrodes as transmitter electrodes 280 when the input device 100 is operating in the second type of capacitive sensing, i.e., transcapacitive sensing. The transmitter circuitry of the display driver module 202 may be configured to drive a vary voltage signal onto the transmitter electrode 280 or toggling the transmitter electrode 280 between two voltage potentials via a plurality switches when the input device 100 is operating in the second type of capacitive sensing.

While the processing system 110 illustrated in FIG. 2 comprises three modules, the processing system 110 may be implemented with more or less modules to control the various components in the input device 100. For example, the functions of the display driver module 202 and the sensor module 204 (and optionally, the determination module 206) may be implemented in a single integrated circuit (shown in phantom as an integrated circuit (IC) 210) that can control the display module elements (e.g., common electrodes) in one mode of operation and that can control the display module elements (e.g., common electrodes) and drive transmitter signals and/or receiver resulting signals transmitted with and/or received from the sensor electrodes 120, which may comprise the receiver electrodes 270 and transmitter electrodes 280, while in another mode of operation. In some configurations, the processing system 110 may comprise a display driver module 202, a sensor module 204, and a determination module 206 that are disposed within one or any number of ICs found in the processing system 110, depending to the desired processing architecture. In cases where there are more than one modules or ICs, synchronization between modules (e.g., sensor module 204 and display driver module 202) may be achieved by communicating between these systems using a synchronization mechanism. In one embodiment, the synchronization mechanism comprises a synchronization protocol that controls a number of functionality provided by the processing system 110, such as controlling oscillator frequency, transmitter signal pulses, and glass-specific features (e.g., enable/disable gate lines). In one example, the synchronization mechanism may synchronize display updating cycle and capacitive sensing cycle by providing a synchronized clock, information about display driving state, information about the capacitive sensing state, direction to display update circuitry to update (or not to update), direction to capacitive sensing circuitry to sense (or not to sense), and/or the like. In one embodiment, the process of synchronizing the components that are controlling the selection of common electrodes and the components that are controlling the creation of the sensing images may include sending periodic communications between these various components, such as control signals.

As discussed above, the input device 100 may be configured to provide input to the electronic system 150, and as such, the processing system 110 of the input device 100 may be configured to communicate with parts of the electronic system 150, for example, the host processor 208 of the electronic system 150, in order to control and coordinate display and input sensing activities. In the embodiment depicted in FIG. 2, the host processor 208 of the electronic system 150 communicates to the display driver module 202 of the input device 100 through a communication path 222. The host processor 208 may also communicates to the sensor module 204 of the input device 100 through the communication path 222. The communication path 222 may be wired or wireless as described above. The communication between the host processor 208 and the display and sensor modules 202, 204 may be bi-directional.

In one embodiment, gate-in-panel logic (GIP) logic 244 is provided to couple selected segments 260 of the transmitter electrodes 280 to either the display driver module 202 or the sensor module 204 depending on the type of capacitive sensing being performed by the input device 100. In other embodiments, the selected segments 260 of the transmitter electrodes 280 may be selectively coupled using other devices internal or external to the processing system 110. The GIP logic 244 is also configured to couple the display driver module 202 to the common electrodes which comprise one or more of the transmitter electrodes 280 to enable updating of display images. The GIP logic 244 includes circuitry, some or all which may be formed in a switch integrated circuit (switch IC) 246 formed on the substrate 220 shared with one or more of the sensor electrodes 120. The switch IC 246 containing some or all of the circuitry of the GIP logic 244 may alternatively be formed on a flextail 248 routed between the sensor electrodes 120 and the processing system 110 or other suitable location. Conductors 240, 242 are routed through the flextail 248 to provide communication between the transmitter electrodes 280 and the display driver module 202 and sensor module 204 of the processing system 110. Conductors 250 are also routed through the flextail 248 to provide communication between the receiver electrodes 270 and the sensor module 204 of the processing system 110.

The GIP logic 244 includes a plurality of display driver coupling (DDC) switches 230 and a plurality of transmitter electrode segmenting (TES) switches 232. In one or more embodiments, the GIP logic 244 may comprise a clock to select the transmitter electrodes 280 utilized for transcapacitive sensing routines and a separate clock to select the segments 260 of the transmitter electrodes 280 utilized for absolute sensing routines. In one or more embodiments, the GIP logic 244 may comprise a single clock to select the transmitter electrodes 280 utilized for transcapacitive sensing routines and to select the segments 260 of the transmitter electrodes 280 utilized for absolute sensing routines. In a transcapacitive sensing mode of operation, the switches 230, 232 may be controlled, closed one switch at a time or multiple switches at a time, such that the switches are closed according to the transcapacitive driving sequence. In an absolute sensing mode of operation, the switches 230, 232 may be controlled, closed one switch at a time or multiple switches at a time, such that the switches are closed according to the absolute driving sequence.

Each DDC switch 230 has at least a first state and a second state. The first state of the DDC switch 230 is operable to couple the conductor 240 to at least one of the transmitter electrodes segments 260 comprising one of the transmitter electrodes 280. The second state of the DDC switch 230 is operable to decouple the connection (i.e., open) between conductor 240 and the transmitter electrodes segments 260. For example in the first state, the DDC switch 230 couples the transmitter electrode segment 260-1 of the first transmitter electrode 280-1 to the display driver module 202 through the conductor 240, while in the second state, the DDC switch 230 opens (disconnects) the connection between the display driver module 202 and the transmitter electrodes 280.

Figure 4:
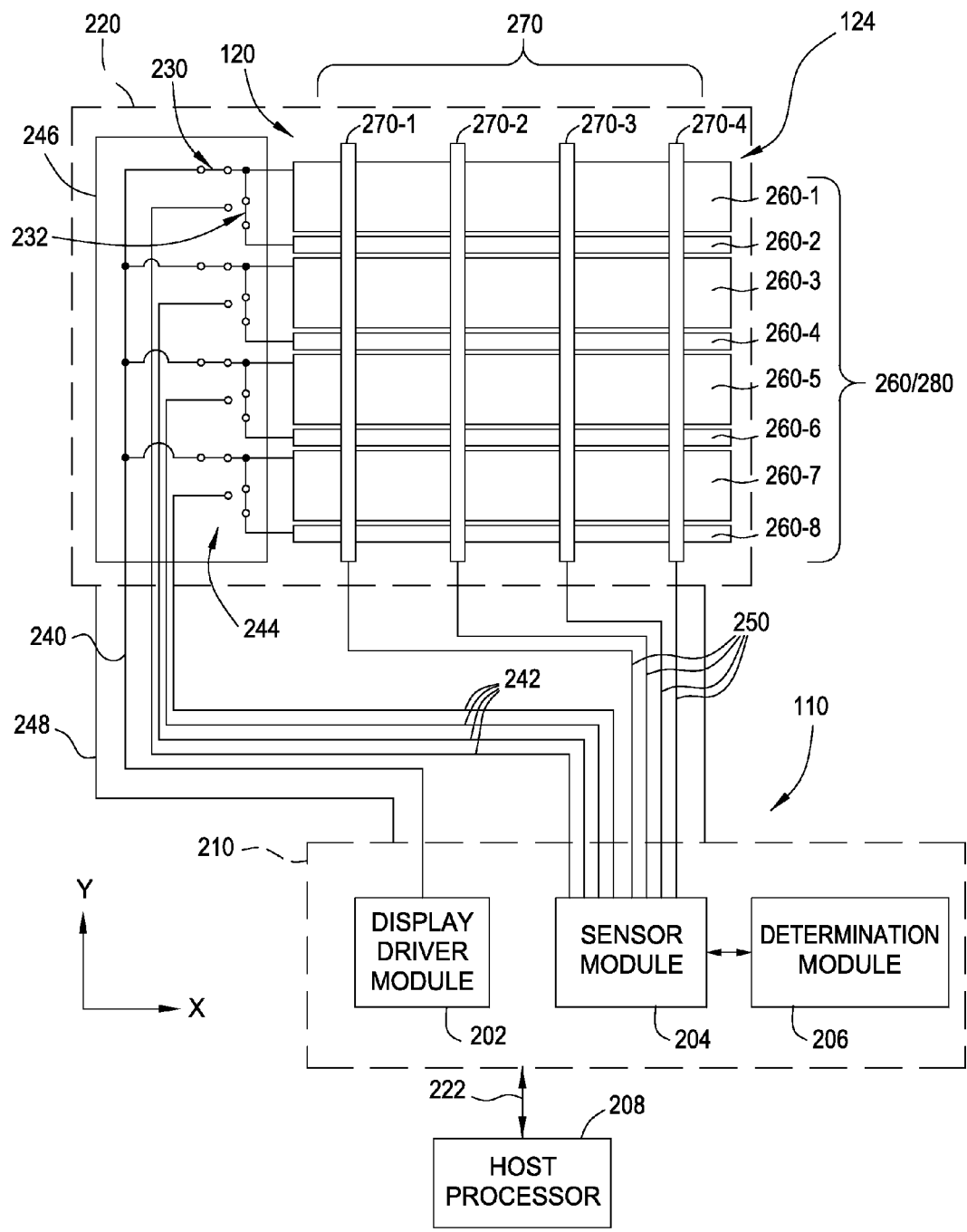
FIG. 4 is the array of sensing elements of FIG. 2 in a mode of operation different than as shown in FIG. 2.

The TES switch 232 also has at least a first state and a second state. The first state of the TES switch 232 is operable to couple the conductor 242 to at least one of the transmitter electrodes segments 260 comprising one of the transmitter electrodes 280. The second state of the TES switch 232 is operable to decouple the connection (i.e., open) between conductor 242 and the transmitter electrodes segments 260, while coupling the at least two of the transmitter electrodes segments 260 comprising one of the transmitter electrodes 280. For example in the first state, the TES switch 232 decouples at least two of the transmitter electrode segments 260 of the transmitter electrode 280, shown in FIG. 2 as transmitter electrodes segment 260-1 decoupled from transmitter electrodes segment 260-2 of the first transmitter electrode 280-1, while coupling the first transmitter electrode 280-1 to the sensor module 204 through the conductor 242. In the second state the TES switch 232 connects the least two of the transmitter electrode segments 260 of the transmitter electrode 280, shown in FIG. 4 as transmitter electrodes segment 260-1 coupled to the transmitter electrodes segment 260-2 of the first transmitter electrode 280-1, while decoupling the first transmitter electrode 280-1 from the conductor 242 and hence the sensor module 204.

The DDC and TES switches 232, 230 may be a transistor or other solid state switching device. The state of the DDC and TES switches 232, 230 may be controlled via a signal from the processing system 110 and/or host processor 208 of the electronic system 150.

In operation, the states of the DDC and TES switches 232, 230 may be selected to better configure the sensor electrodes 120, and more specifically the transmitter electrodes 280, for a particular type of capacitive sensing. In a first example, the states of the DDC and TES switches 232, 230 may be selected to couple less than all the segments 260 comprising one of the transmitter electrodes 280 to the sensor module 204 to enable a first type of capacitive sensing to be performed. In embodiments wherein the first type of capacitive sensing is an absolute sensing routine, the reduced plan area of the selected segments 260 relative to the plan area of the transmitter electrode 280 when having all segments 260 coupled together allows for more robust capacitive sensing as the capacitive load on the segments 260 of the transmitter electrodes 280 being utilized is reduced. As the segments 260 still intersect with the receiver electrodes 270 defining an array of capacitive pixels, the absolute sensing may be utilized absolute capacitance sensing in both X and Y directions. Moreover, since absolute sensing allows more robust detection of input objects that are hovering in the sensing region 170, the first type of capacitive sensing, when configured for an absolute sensing routine, is particularly suitable for use in low power modes, such as when the input device 100 is in a sleep mode and is periodically looking in the sensing region 170 for an indication that a wake-up signal or gesture is being performed.

The segments 260 of the transmitter electrode 280 and the receiver electrodes 270 not being utilized for the absolute capacitance sensing routine may be driven with a substantially constant voltage, electrically floated or driven with a varying voltage or guard signal. For example, the absolute capacitance sensing routine may scan through the plurality of transmitter electrodes 280 and the receiver electrodes 270 to obtain information indicative of input in the sensing region 170 at each capacitive pixel, while providing a substantially constant voltage, electrically floating or driving with a varying voltage or guard signal on the sensor electrodes 120 not comprising the capacitive pixel being addressed to obtain input information.

In a second example, the states of the DDC and TES switches 232, 230 may be selected to couple all the segments 260 comprising one of the transmitter electrodes 280 to the sensor module 204 to enable a second type of capacitive sensing to be performed. In embodiments wherein the second type of capacitive sensing is a transcapacitive sensing routine, the large plan area of the transmitter electrodes 280 relative to the small plan area of the receiver electrodes 270 allows for robust capacitive sensing in both the X and Y directions, including in instances where more than one input object 140 is present in the sensing region 170. Moreover, the second type of capacitive sensing configured as a transcapacitive sensing routine permits detection of wake-up gestures and codes, making the second type of capacitive sensing complimentary for determining if the input device 100 should fully wake and exit a low power mode, or if the input device 100 should return to a low power state, e.g., a sleep mode, and revert to performing a less power consuming type of capacitive sensing, such as absolute sensing.

Figure 5:
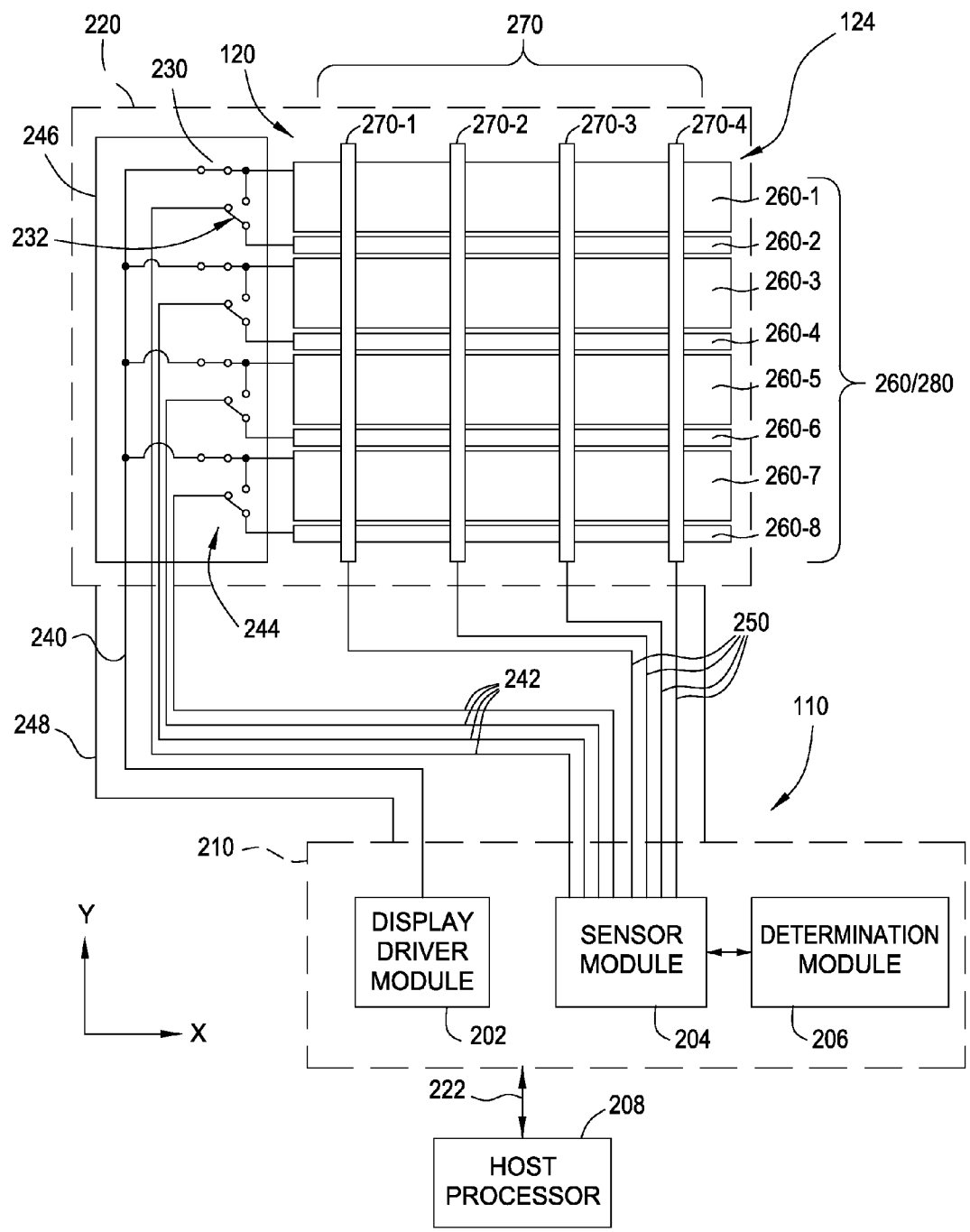
FIG. 5 is the array of sensing elements of FIG. 2 in yet another mode of operation.

In a third example, the DDC and TES switches 232, 230 may be in a third state as shown in FIG. 5. In the third state, the DDC and TES switches 232, are disposed in a state selected to couple one of the segments 260 comprising a selected transmitter electrode 280 to the display driver module 202 and to couple a different one of the segments 260 comprising the selected transmitter electrodes 280 to the sensor module 204 to enable a third type of capacitive sensing to be performed, for example, a transcapacitive sensing routine.

In another embodiment of the third example in which the DDC and TES switches 232, 230 are disposed in a state selected to couple one of the segments 260 comprising a selected transmitter electrode 280 to the display driver module 202 and to couple a different one of the segments 260 comprising the selected transmitter electrodes 280 to the sensor module 204, the segments 260 are of the same plane area. Thus, the switches 232, 230 allow connection of an electrode in VCOM layer (i.e., the transmitter electrode 280) to either the display driver module 202 or the sensor module 204 to enable an absolute sensing routine or a transcapacitive sensing routine either as selected by the host processor 208 or in response to detection of an input object 140 in the sensing region 170.

The ability of the processing system 110 to switch between different types of capacitive sensing techniques enables the input device 100 to more accurately detect the presence of one or more input object 140 in the sensing region 170 by appropriately applying the capacitive sensing technique most suitable for the type of input event. Moreover, ability of the processing system 110 to switch between different types of capacitive sensing techniques enables the input device 100 to more efficiently manage power consumption by utilizing the capacitive sensing technique that consumes the least amount of power, then switching to a more power consuming capacitive sensing technique only when the type of input event requires. Furthermore, the ability of the processing system 110 to change the size of the sensor electrodes 120 utilized for different types of capacitive sensing techniques enables the input device 100 to more accurately detect the presence of one or more input object 140 in the sensing region 170 by reducing the capacitive load on the sensor electrodes 120 when utilized for certain types of capacitive sensing techniques.

Figure 6:
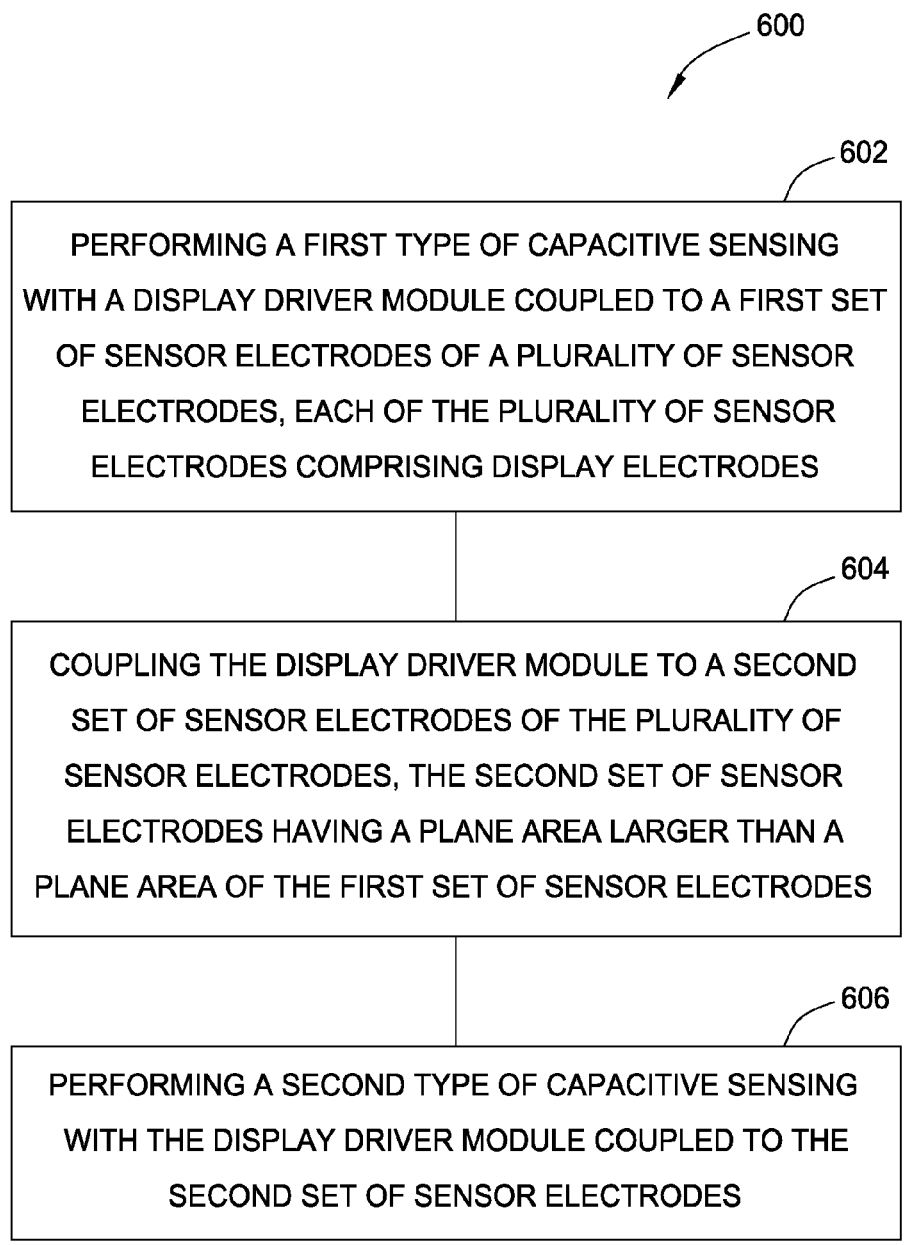
FIG. 6 is a flow diagram of a method for sensing presence of an input object using a capacitive sensing device.

FIG. 6 is a flow diagram of a method 600 for sensing presence of an input object using a capacitive sensing device. The method 600 begins step 602 by performing a first type of capacitive sensing with a display driver module coupled to a first set of sensor electrodes of a plurality of sensor electrodes, each of the plurality of sensor electrodes comprising display electrodes. The first set of sensor electrodes define one of the transmitter electrodes, for example transmitter electrode 280-1, and accordingly may comprise one or more electrode segments, such as the transmitter electrode segments 260 described above. In one embodiment, the first type of capacitive sensing is an absolute capacitive sending routine.

At step 604, the display driver module is coupled to a second set of sensor electrodes of the plurality of sensor electrodes, the second set of sensor electrodes having a plane area larger than a plane area of the first set of sensor electrodes. The second set of sensor electrodes define one of the transmitter electrodes 280, and accordingly may comprise one or more electrode segments, such as the transmitter electrode segments 260 described above, with at least one transmitter electrode segments 260 shared between the first and second sets of sensor electrodes 120. The change in plane area between the sets of sensor electrodes may be made utilizing the switches 230, 232 as described above, or other suitable technique. The change in plane area between the sets of sensor electrodes may be made in response to detection of an input object 140 in the sensing region 170, an instruction from the host processor 208, or in response to expiration of a predefined period of time.

At step 604, a second type of capacitive sensing is preformed with the display driver module coupled to the second set of sensor electrodes. In one embodiment, the second type of capacitive sensing is a transcapacitive sensing routing. During the transcapacitive sensing routing, the transmitter electrodes 280 may be scanned to obtain a capacitive image.

Thus, embodiments described herein advantageously an ability to control the plane area of transmitter electrodes to enhance absolute capacitance measurements. These measurements can enable two dimensional (2D) proximity sensing that enable hovering finger detection and tracking. Since capacitive loading of the sensing electrodes is generally proportional to area of the electrodes, high capacitive loading is avoided by using only a small number of the segments comprising a transmitter electrode when obtaining absolute capacitance measurements. The entire transmitter electrode, e.g., all of the segments comprising the transmitter electrode, may still be used to enable robust transcapacitive sensing when desired.

Selection of the plane area of the transmitter electrodes may be controlled utilizing switches. For example, a switch connecting two sensor electrodes may be closed to create a single large area transmitter electrode for transcapacitive sensing. Conversely, the switch may be opened to isolate the segments of the transmitter electrode, such that only a portion of the transmitter electrode, i.e., one of the sensor electrodes, is utilized for absolute capacitance sensing.

In conclusion, embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. An input device comprising a display device having an integrated capacitive sensing device, the input device comprising:
   a plurality of sensor electrodes, each of the plurality of sensor electrodes comprising at least one of a plurality of display electrodes, the plurality of sensor electrodes comprising a first group of transmitter electrodes, a second group of transmitter electrodes, and a plurality of receiver electrodes, wherein at least a first sensor electrode of the first group of transmitter electrodes is disposed between a first sensor electrode and a second sensor electrode of the second group of transmitter electrodes; and
   a processing system configured to be selectively coupled to the first sensor electrode of the first group of transmitter electrodes and to the first sensor electrode of the second group of transmitter electrodes, wherein the processing system is configured to be selectively coupled to the first sensor electrode of the first group of transmitter electrodes when the processing system is operating in a first input sensing mode, and the processing system is configured to be selectively coupled to the first electrode of the second group of transmitter electrodes when processing system is operating in a second input sensing mode, wherein a plane area of the first sensor electrode of the first group of transmitter electrodes is greater than a plane area of the first sensor electrode of the second group of transmitter electrodes.

2. The input device of claim 1 further comprising:
   a plurality of receiver electrodes coupled to the processing system.

3. The input device of claim 1 further comprising:
   a first sensor electrode switch of a plurality of sensor electrode switches that is operable to couple the first sensor electrode of the first group of transmitter electrodes and the first sensor electrode of the second group of transmitter electrodes to the processing system when the processing system is operating in the first input sensing mode.

4. The input device of claim 1, wherein the plurality of sensor electrodes comprise common electrodes of the display device.

5. The input device of claim 1 further comprising:
a plurality of sensor electrode switches including a first sensor electrode switch that is operable change a plane area of at least one of a receiver electrode and transmitter electrode included in the plurality of sensor electrodes.

6. The input device of claim 1, wherein the receiver electrodes and transmitter electrodes are disposed on different layers.

7. The input device of claim 1 further comprising:
a plurality of sensor electrode switches including a first sensor electrode switch that is disposed in or one at least one of gate switching logic, the processing system, a substrate stack of the display device and a separate switching mechanism.

8. The input device of claim 1, wherein the first sensor electrode of the first group of transmitter electrodes is substantially equal in length but different in width relative to the first sensor electrode of the second group of transmitter electrodes.

9. The input device of claim 8, wherein each sensor electrode of the first group of transmitter electrodes is paired with a different one of the second group of transmitter electrodes.

10. The input device of claim 1, wherein each sensor electrode of the first group of transmitter electrodes is paired with a different one of the second group of transmitter electrodes.

11. An input device comprising a display device having an integrated capacitive sensing device, the input device comprising:
a plurality of sensor electrodes, each of the plurality of sensor electrodes comprising at least one of a plurality of display electrodes;
a processing system configured to be selectively coupled to a first sensor electrode of the plurality of sensor electrodes and to a second sensor electrode of the plurality of sensor electrodes, wherein the processing system is configured to be selectively coupled to the first sensor electrode of the plurality of sensor electrodes when the processing system is operating in a first input sensing mode, and the processing system is configured to be selectively coupled to the second electrode of the plurality of sensor electrodes when processing system is operating in a second input sensing mode, wherein a plane area of the first sensor electrode is greater than a plane area of the second sensor electrode; and
a plurality of receiver electrodes coupled to the processing system; and
a plurality of receiver electrode switches coupling the plurality of receiver electrodes to the processing system, wherein a first receiver electrode switch of the plurality of receiver electrode switches is operable to couple a first set of receiver electrodes comprising at least a first receiver electrode of the plurality of receiver electrodes to the processing system when the processing system is operating in the first input sensing mode, and operable to couple a second set of receiver electrodes comprising the first receiver electrode and at least a second receiver electrode of the plurality of receiver electrodes when the display driver module is operating in the second input sensing mode, wherein a plane area of the first set of receiver electrodes is greater than a plane area of the second set of receiver electrodes.

12. A method for sensing presence of an input object using capacitive sensing device, comprising:
coupling a first set of sensor electrodes of a plurality of sensor electrodes to a processing system, the processing system configured to drive the first set of sensor electrodes for absolute capacitive sensing, wherein each of the plurality of sensor electrodes comprising display electrodes and the processing system is configured for display updating and capacitive sensing; and
coupling a second set of sensor electrodes of the plurality of sensor electrodes to the processing system, the processing system configured to drive the second set of sensor electrodes for transcapacitive sensing, wherein at least a first sensor electrode of the first set of sensor electrodes is disposed between a first sensor electrode and a second sensor electrode of the second set of sensor electrodes, and wherein the second set of sensor electrodes have a plane area larger than a plane area of the first set of sensor electrodes.

13. The method of claim 12, wherein coupling the first set of sensor electrodes to the processing system comprises: coupling the first set of sensor electrodes with a sensor module of the processing system and wherein coupling the second set of sensor electrodes to the processing system comprises coupling the second set of sensor electrodes to a display driver module of the processing system.

14. The method of claim 12, wherein coupling the second set of sensor electrodes to the processing system comprises:
coupling the second set of sensor electrodes to the processing system in response to presence of at least one input object detected by the processing system while coupled to the first set of sensor electrodes.

15. The method of claim 12, wherein coupling the second set of sensor electrodes to the processing system comprises:
coupling the first set of sensor electrodes to the processing system, wherein the processing system is further configured to drive the first set of sensor electrode for transcapacitive sensing while driving the second set of sensor electrodes for transcapacitive sensing.

16. The method of claim 12, coupling the first set of sensor electrodes to the processing system comprises:
at least one of decoupling the second set of sensor electrodes from the processing system and driving the second set of sensor electrodes with at least one of a substantially constant voltage or a guarding signal.

17. The processing system of claim 12, wherein coupling the processing system to the second set of sensor electrodes of the plurality of sensor electrodes comprises:
coupling the processing system to the second set of sensor electrodes at a predefined frequency.

* * * * *